US007499019B2

(12) United States Patent
Lee et al.

(10) Patent No.: US 7,499,019 B2
(45) Date of Patent: Mar. 3, 2009

(54) LIQUID CRYSTAL PANEL AND LIQUID CRYSTAL DISPLAY DEVICE HAVING THE SAME

(75) Inventors: Hyun Joo Lee, Seoul (KR); Kyo Seop Choo, Suwon-si (KR)

(73) Assignee: LG. Display Co., Ltd., Seoul (KR)

( * ) Notice: Subject to any disclaimer, the term of this patent is extended or adjusted under 35 U.S.C. 154(b) by 661 days.

(21) Appl. No.: 11/172,237

(22) Filed: Jun. 29, 2005

(65) Prior Publication Data

US 2006/0145977 A1 Jul. 6, 2006

(30) Foreign Application Priority Data

Dec. 31, 2004 (KR) ...................... 10-2004-0118072

(51) Int. Cl.
*G09G 3/36* (2006.01)
*G02F 1/1345* (2006.01)

(52) U.S. Cl. ......................... 345/103; 345/1.1; 349/149

(58) Field of Classification Search .................. 345/87, 345/204, 1.1–1.3, 103; 349/149, 151
See application file for complete search history.

(56) References Cited

U.S. PATENT DOCUMENTS 5,808,596 A * 9/1998 Kim ............................ 345/98
6,738,030 B2 * 5/2004 Kim et al. ...................... 345/45
7,002,657 B2 * 2/2006 Hirosue et al. .............. 349/149
2004/0119675 A1 * 6/2004 Washio et al. ................. 345/87

* cited by examiner

*Primary Examiner*—Amr Awad
*Assistant Examiner*—Stephen G Sherman
(74) *Attorney, Agent, or Firm*—Brinks Hofer Gilson & Lione

(57) ABSTRACT

An LC panel and an LCD device having an LC panel are provided. The LC panel has a display part and a non-display part. Gate lines and data lines are arranged in a matrix on the display part. The gate lines include a first gate line group and a second gate line group. The first gate line group extends from one end of the display part and does not overlap the extending data lines; the second gate line group extends from an opposite end of the display part and overlaps the extending data lines. The disclosed devices and methods of using such allow one to control signal delay times to the first and second gate line groups so as to improve image quality or prevent imaging defects.

5 Claims, 6 Drawing Sheets

LIQUID CRYSTAL PANEL AND LIQUID CRYSTAL DISPLAY DEVICE HAVING THE SAME

BACKGROUND OF THE INVENTION

This application claims the benefit of priority to Korean Patent Application No. 10-2004-0118072, filed on Dec. 31, 2004, herein incorporated by reference.

1. Field of the Invention

The present invention relates to devices and methods for providing improved image quality, including the use of liquid crystal (LC) panels and liquid crystal display devices (LCD). The devices and methods of the present invention can improve image quality by preventing formation of imaging defects.

2. Description of the Related Art

An active matrix LCD displays an image by controlling light transmittance of LC panels by using thin film transistors (TFTs) as switching devices. Since an LCD can be made small compared with a cathode ray tube (CRT), the LCD has been commercially used as a display device for a portable devices, including laptop personal computers (PC).

FIG. 1 is a view of a portable LCD of a related art. The portable LCD includes an LC panel 2, and a gate driver 4 and data driver 6 for driving the LC panel 2. The LC panel 2 has a display part 10 for displaying data.

The display part 10 includes a first gate line group of GL1~GLn and a second gate line group of GLn+1~GL2*n* arranged thereon with data lines DL1~DLm arranged perpendicularly to the first and second gate line groups of GL1~GL2*n*. The first gate line group of GL1~GLn and the data lines DL1~DLm define pixel regions and TFTs are arranged on the pixel regions.

To optimize space on a portable LCD, the gate driver 4 and the data driver 6 can be arranged on one side of the LCD. For example, referring to FIG. 1, the gate driver 4 and the data driver 6 can be arranged on the lower side of the LC panel 2.

The gate driver 4 can be mounted on a gate tape carrier package (TCP) and the data driver 6 can be mounted on a data TCP. The gate TCP and the data TCP are electrically connected to the LC panel 2.

In this case, the first gate line group of GL1~GLn disposed on the display part 10 extends to the left, then downward, along the left edge of the LC panel 2, extending therefrom to a gate driver 4.

The second gate line group of GLn+1~GL2*n* disposed on the display part 10 extends to the right, then downward, along the right edge of the LC panel 2, extending therefrom to a gate driver 4.

The data lines DL1~DLm disposed on the display part 10 extend downward to the data driver 6 disposed on the lower side.

The extending first and second gate line groups GL1~GL2*n* and the extending data lines DL1~DLm have pads formed on their ends. The pads are connected to the gate TCP and the data TCP.

FIG. 2 is a sectional view of the portable LCD of FIG. 1, taken along a line A-A'. The first gate line group 20 of GL1~GLn is formed on the substrate 11; a gate insulation layer 21 is formed on the substrate 11 and on the first gate line group 20 of GL1~GLn. The data lines 18 of DL1~DLm are formed on the gate insulation layer 21 and are perpendicular to the first gate line group 20 of GL1~GLn.

The data lines DL1~DLm connected to the data driver 6 (FIG. 1) overlap with the first gate line group of GL1~GLn connected to the gate driver 4 (FIG. 2). The data lines 18 of DL1~DLm have a passivation layer 19 thereon. Since the length of the first gate line group 20 of GL1~GLn is long and the data lines 18 of DL1~DLm are formed on the first gate line group 20 of GL1~GLn, capacitance is generated between the first gate line group of GL1~GLn and the data lines DL1~DLm.

FIG. 3 is a sectional view of the portable LCD of FIG. 1, taken along a line B-B'. Referring to FIG. 3, the second gate line group 20 of GLn+1~GL2*n* is formed on the substrate 11 and a gate insulation layer 21 is formed on the substrate 11 and on a second gate line group 20 of GLn+1~GL2*n*. The insulation layer 21 has a passivation layer 19 thereon. In this case, the data lines DL1~DLm are not formed on the second gate line group 20 of GLn+1~GL2*n*. Since the second gate line group 20 of GLn+1~GL2*n* and the data lines DL1~DLm do not overlap, capacitance is not generated in the second gate line group 20 of GLn+1~GL2*n*.

Moreover, since the length of the first gate line group of GL1~GLn is longer than that of the second gate line group of GLn+1~GL2*n*, line resistance is greater in the first gate line group of GL1~GLn than in the second gate line group of GLn+1~GL2*n*. In view of the line resistances in the first and second gate line groups and the capacitance generated in the first gate line group 20 of GL1~GLn, there is a characteristic delay associated with a scan signal supplied to the first gate line group of GL1~GLn and another characteristic associated delay associated with a scan signal supplied to the second gate line group of GLn+1~GL2*n*. The delays in scan signal transmission may cause a defect in image quality in which a horizontal line appears at the boundary between the first gate line group of GL1~GLn and the second gate line group of GLn+1~GL2*n*.

SUMMARY OF THE INVENTION

Accordingly, the present invention is directed to devices providing improved image quality, in particular, liquid crystal (LC) panels and liquid crystal display devices (LCD). The devices of the present invention obviate one or more problems associated with the related art.

One object of the present invention is to provide an LC panel and an LCD having the same capable of improving image quality by preventing imaging defects.

Another object of the present invention is to provide a method for improving image quality or preventing imaging defects by controlling signal delay times to the first and second gate line groups in an LCD panel.

Additional advantages, objects, and features of the invention are set forth in the description which follows and will be apparent to those of ordinary skill in the art examining the information contained herein. The objectives and advantages of the present invention may be realized or achieved with the embodiments set forth in the specification, claims, and appended drawings.

In one aspect, the present invention provides a device for improved image quality having an LC panel, the LC panel having: a display part with gate lines and data lines arranged thereon, the gate lines including a first gate line group and a second gate line group, and a non-display part having gate lines and data lines extending from the display part, wherein the first gate line group extends from one end of the display part and does not overlap the extending data lines, and the second gate line group extends from an opposite end of the display part and overlaps the extending data lines.

In another aspect of the present invention, an LCD device is provided having an LC panel, a gate driver, and a data driver. In this aspect, the LC panel includes a display part with gate lines and data lines arranged thereon, the gate lines including a first gate line group and a second gate line group, and a non-display part, having gate lines and data lines extending from the display part, wherein the first gate line group extends from one end of the display part and does not overlap the extending data lines, and the second gate line group extends from an opposite end of the display part and overlaps the extending data lines. The gate driver is electrically connected to the extending first gate line group and to the extending second gate line group and the data driver is electrically connected to the extending data lines.

In a further aspect, the present invention provides a method for improving image quality in a liquid crystal display device. The method includes providing a liquid crystal display device having an LC panel (as in the foregoing description above), a gate driver and a data driver; supplying scan signals from the gate driver to the first and second gate line groups in response to signal from a controller, and sufficiently controlling signal delay times to the first and second gate line groups to improve image quality and/or prevent imaging defects.

It is to be understood that both the foregoing general description and the following detailed description are exemplary of the present invention and are intended to further illustrate the invention set forth in the specification, claims, and drawings.

BRIEF DESCRIPTION OF THE DRAWINGS

The accompanying drawings illustrate aspects and principles of the present invention. In the drawings.

DETAILED DESCRIPTION OF THE INVENTION

Reference to various preferred embodiments of the present invention will now be made, examples of which are illustrated in accompanying FIGS. 4-6.

The phrase "formed on" is used throughout the specification and claims to mean a structure directly adjoined to another structure or a structure having one or more intermediate structures between itself and another structure.

The present invention provides inventive LC panel devices and methods for improving image quality or preventing at least one imaging defect. In one aspect, the present invention provides an inventive LC panel of the present invention. In another aspect, the present invention provides an LCD containing an inventive LC panel of the present invention.

Figure 1:
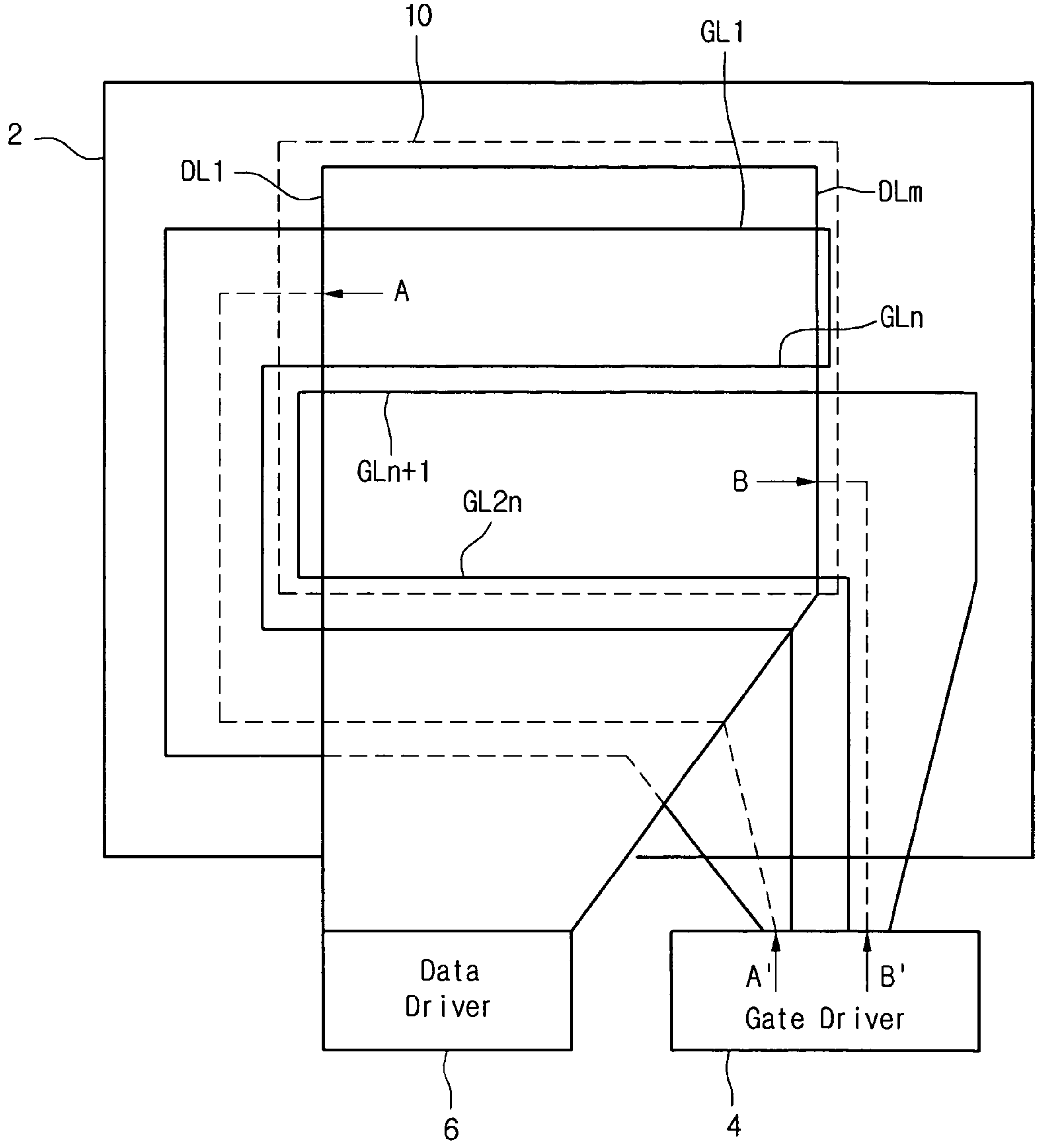
Fig.1 Related Art
FIG. 1 is a view of a portable LCD in a related art.
Figure 2:
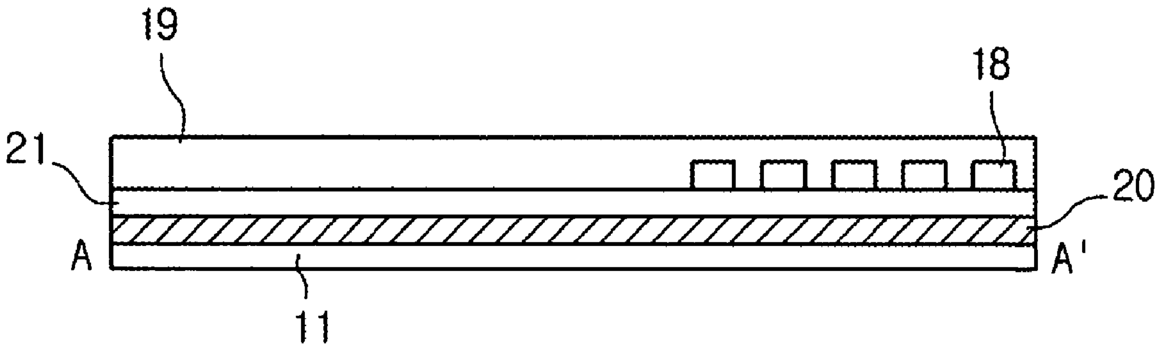
Fig.2 Related Art
FIG. 2 is a sectional view of the portable LCD of FIG. 1, taken along a line A-A'.
Figure 3:
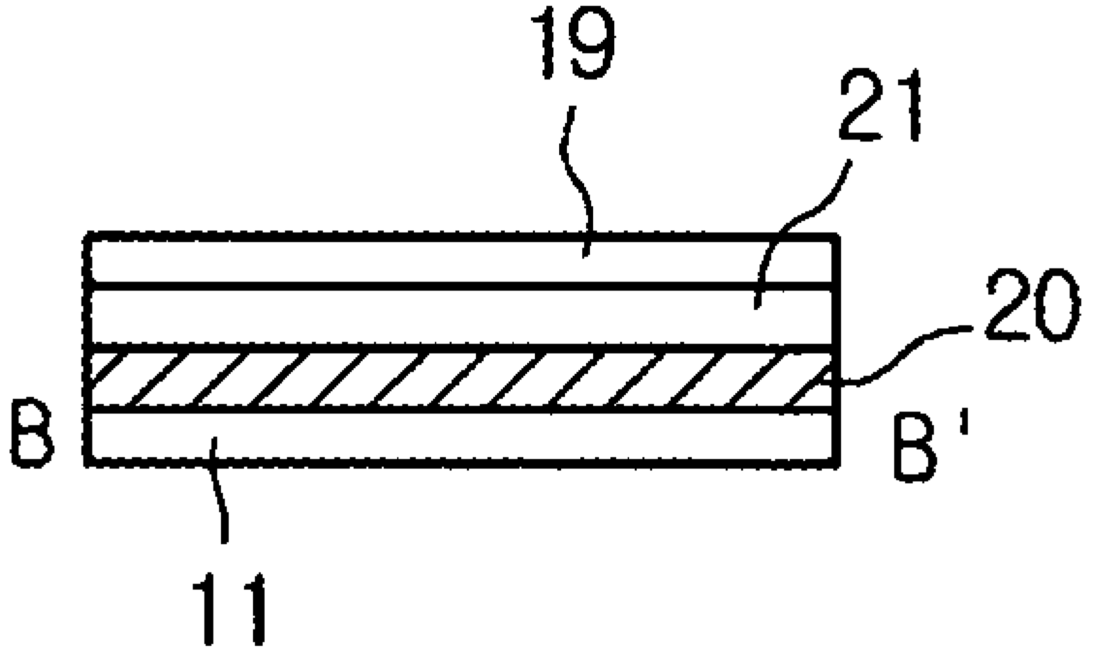
Fig.3 Related Art
FIG. 3 is a sectional view of the portable LCD of FIG. 1, taken along a line B-B'.
Figure 4:
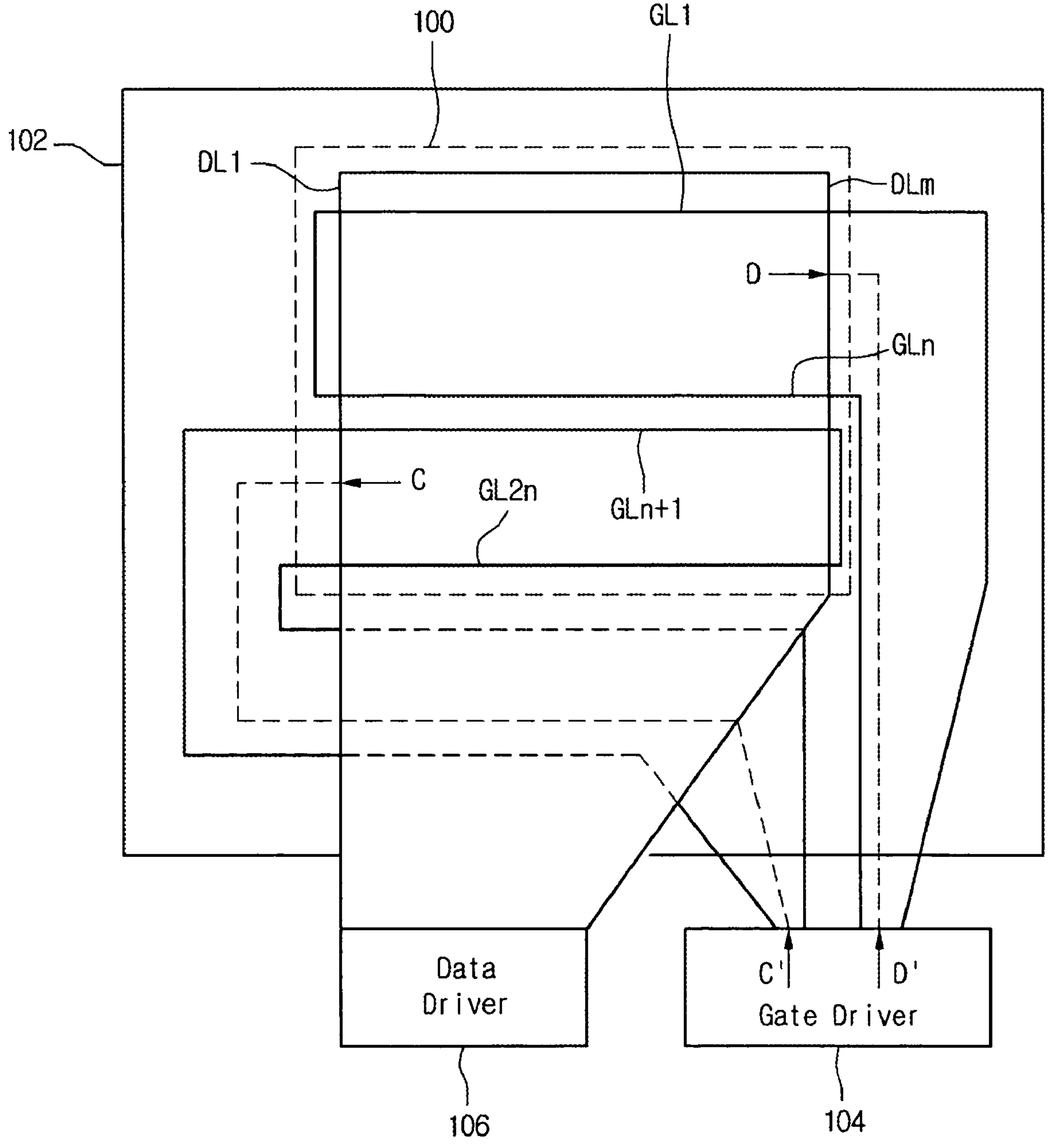
FIG. 4 is a view of a portable LCD according to the present invention.

FIG. 4 is a view of a portable LCD according to the present invention. The LCD includes an LC panel 102 with a display part 100 for displaying data and a gate driver 104 and a data driver 106 for driving the LC panel 102.

The display part 100 includes a first gate line group of GL1~GLn and a second gate line group of GLn+1~GL2*n* arranged thereon and further includes data lines DL1~DLm arranged perpendicular to the first and second gate line groups of GL1~GL2*n*. The first gate line group of GL1~GLn and the data lines DL1~DLm define pixel regions and TFTs are arranged on the pixel regions.

The gate driver 104 may be mounted on a gate TCP and the data driver 106 may be mounted on a data TCP. The gate TCP and the data TCP are electrically connected to the LC panel 102. The gate driver 104 and/or the data driver 106 may be directly formed on the LC panel 102.

In one aspect, the second gate line group of GLn+1~GL2*n* disposed on the display part 100 extends to the left, further extending downward, along the left edge of the LC panel, 102, extending therefrom to the gate driver 104. The first gate line group of GL1~GLn disposed on the display part 100 extends to the right, further extending downward, along the right edge of the LC panel 102, extending therefrom to the gate driver 4.

The data lines DL1~DLm are disposed on the display part 100, extending to the relevant position of the data driver 106.

The extending first and second gate line groups GL1~GL2*n* and the extending data lines DL1~DLm have pads on their ends, each pad connected to a gate TCP or a data TCP.

Figure 5:
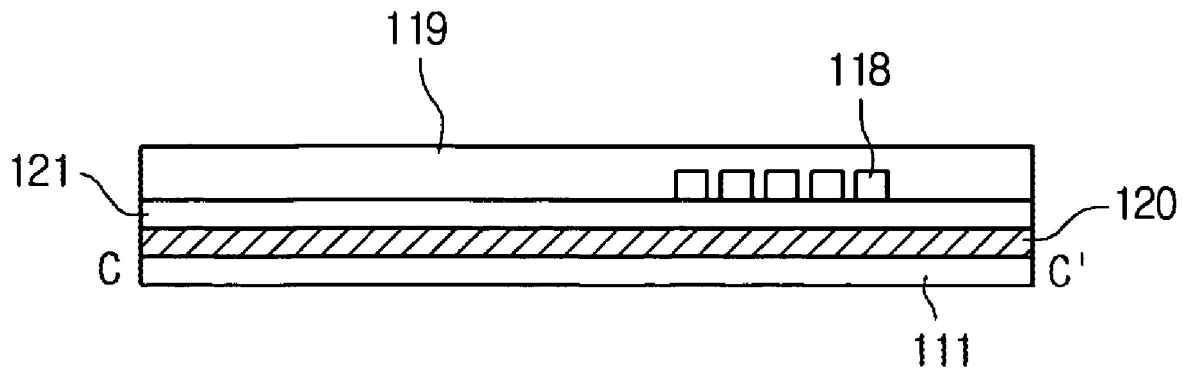
FIG. 5 is a sectional view of the portable LCD of FIG. 4, taken along a line C-C'.

The data lines DL1~DLm connected to the data driver 106 overlap with the second gate line group of GLn+1~GL2*n* connected to the gate driver 104 (FIG. 5). The first gate line group of GL1~GLn does not overlap with the data lines DL1~DLm (FIG. 6). Therefore, capacitance is generated between the data lines DL1~DLm and the second gate line group of GLn+1~GL2*n*.

The gate driver 104 sequentially supplies scan signals (i.e., gate high voltage, gate low voltage) to the first and second gate line groups of GL1~GL2*n* in response to gate control signals provided from a controller. TFTs connected to the first and second gate line groups of GL1~GL2*n* are turned on to supply the scan signals to the gate lines. The first and second gate line groups of GL1~GL2*n* include a second gate line group of GLn+1~GL2*n* that overlaps with the data lines DL1~DLm and a first gate line group of GL1~GLn that does not overlap with the data lines DL1~DLm.

The data driver 106 supplies a pixel signal of one line to the data lines DL1~DLm every horizontal period (H1, H2, . . . ) in response to a data control signal provided from the controller.

The portable LCD may have the gate driver 104 and the data driver 106 arranged on a common side. Accordingly, the data lines DL1~DLm connected to the data driver 106 may overlap with the second gate line group of GLn+1~GL2*n* connected to the gate driver 104.

The first gate line group of GL1~GLn among the first and second gate line groups of GL1~GL2*n* may be connected to half of the gate driver 104. Accordingly, the second gate line group of GLn+1~GL2*n* among the first and second gate line groups of GL1~GL2*n* would be connected to the other half of the gate driver 104.

The length of the first gate line group of GL1~GLn is generally longer than that of the second gate line group of GLn+1~GL2*n*. Accordingly, line resistance in the first gate line group of GL1~GLn is generally greater than the line resistance in the second gate line group of GLn+1~GL2*n*.

The data lines DL1~DLm overlap with the second gate line group of GLn+1~GL2*n*. Therefore, capacitance is generated between the second gate line group of GLn+1~GL2*n* and the data lines DL1~DLm.

FIG. 5 is a sectional view of the portable LCD of FIG. 4, taken along a line C-C'. The second gate line group 120 of GLn+1~GL2*n* is formed on a substrate 111. The gate insulation layer 121 is formed on the substrate 111 and on the second gate line group 120 of GLn+1~GL2*n*. The data lines 118 of DL1~DLm have a passivation layer 119 thereon. The data lines 118 of DL1~DLm are formed on the gate insulation layer 121 and are perpendicular to the second gate line group 120 of GLn+1~GL2*n*.

Since the length of the second gate line group 120 of GLn+1~GL2*n* is shorter than the length of the first gate line group of GL1~GLn, and since the data lines 118 of DL1~DLm are formed on the second gate line group 120 of GLn+1~GL2*n*, capacitance is generated between the second gate line group of GLn+1~GL2*n* and the data lines 118 of DL1~DLm.

Figure 6:
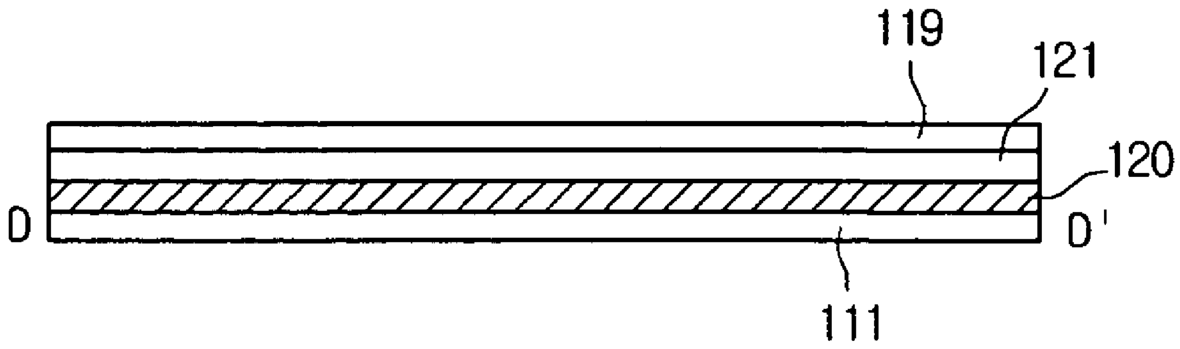
FIG. 6 is a sectional view of the portable LCD of FIG. 4, taken along a line D-D'.

FIG. 6 is a sectional view of the portable LCD of FIG. 4, taken along a line D-D'. Here a first gate line group 120 of GL1~GLn is formed on the substrate 111 and a gate insulation layer 121 is formed on the substrate 111 and on the first gate line group 120 of GL1~GLn. The gate insulation layer 121 has a passivation layer 119 thereon. In this case, the data lines DL1~DLm are not formed on the first gate line group 120 of GL1~GLn. Since the first gate line group 120 of GL1~GLn does not overlap with the data lines DL1~DLm, capacitance is not generated in the first gate line group 120 of GL1~GLn.

As described above, the length of the first gate line group 120 of GL1~GLn is longer than the length of the second gate line group of GLn+1~GL2*n*. Accordingly, line resistance in the first gate line group of GL1~GLn is greater than the line resistance in the second gate line group of GLn+1~GL2*n*. The line resistance has an influence on scan signals supplied to TFTs connected to the first gate line group of GL1~GLn.

Scan signals exhibit characteristic delay times in turning on TFTs. Since the second gate line group of GLn+1~GL2*n* overlaps with the data lines DL1~DLm in the present invention, capacitance is generated between the second gate line group of GLn+1~GL2*n* and the data lines DL1~DLm. Capacitance also influences scan signals supplied to TFTs connected to the second gate line group of GLn+1~GL2*n*. Because scan signals exhibit characteristic delay time in turning on TFTs, capacitance in the second gate line group can further influence signal delay times to the second gate line group.

In accordance with the present invention, devices and methods are provided which allow for resistance in the first gate line group of GL1~GLn to be designed so that its influence on scan signal delays in the first gate line group is equivalent to the influence of resistance and capacitance in the second gate line group on scan signal delays. Accordingly, the length of the first gate line group of GL1~GLn can be controlled according to the degree of influence on the scan signals by the resistance in the second gate line group and the capacitance generated between the second gate line group of GLn+1~GL2*n* and the data lines DL1~DLm.

In accordance with the present invention, scan signals supplied to the second gate line group of GLn+1~GL2*n* and the first gate line group of GL1~GLn can be designed to have a predetermined degree of delay. Further, scan signals can be designed with predetermined delay times, such that there is almost no delay between a scan signal supplied to an n-th gate line GLn of the first gate line group of GL1~GLn and a scan signal supplied to an (n+1)-th gate line GLn+1 of the second gate line group of GLn+1~GL2*n*. Therefore, scan signals are preferably designed so that the delay times for generating scan signals to the first and second gate line groups do not substantially differ from one another. By reducing the delay between the first gate line group of GL1~GLn and the second gate line group of GLn+1~GL2*n*, defects in image quality can be prevented, thereby improving image quality.

Capacitance is generated between the second gate line group of GLn+1~GL2*n* and the data lines DL1~DLm. The length of the first gate line group of GL1~GLn is longer than that of the second gate line group of GLn+1~GL2*n*. Thus, the line resistance in the first gate line group of GL1~GLn is greater than the line resistance in the second gate line group of GLn+1~GL2*n*.

A scan signal supplied to the second gate line group of GLn+1~GL2*n* is influenced by the line resistance and the capacitance associated with the second gate line group of GLn+1~GL2*n*. A scan signal supplied to the first gate line group of GL1~GLn is influenced by the line resistance associated with the first gate line group of GL1~GLn. The degree of influence the line resistance of the first gate line group of GL1~GLn has on the scan signal thereof is the same as the degree of influence the line resistance and the capacitance associated with the second gate line group of GLn+1~GL2*n* have on the scan signal thereof. When the scan signal delays to the first and second gate line groups of GL1~GL2*n* are controlled so that they are substantially equivalent, a horizontal line phenomenon at the boundary between the first gate line group of GL1~GLn and the second gate line group of GLn+1~GL2*n* is precluded, thereby resulting in improved image quality.

As described above, the portable LCD controls a delay degree of the scan signals supplied to the first and second gate line groups of GL1~GL2*n* by controlling the length of the second gate line group of GLn+1~GL2*n* overlapping with the data lines DL1~DLm and controlling the length of the first gate line group of GL1~GLn that does not overlap with the data lines DL1~DLm. As scan signals supplied to the first and second gate line groups of GL1~GL2*n* appear to be the same, a horizontal line phenomenon at the boundary between the first gate line group of GL1~GLn and the second gate line group of GLn+1~GL2*n* is precluded, thereby resulting in improved image quality.

A further aspect of the present invention provides a method for improving image quality in a liquid crystal display device. The method includes providing a liquid crystal display device having an LC panel as in the foregoing description above, a gate driver and a data driver; supplying scan signals from the gate driver to the first and second gate line groups in response to signal from a controller, and sufficiently controlling signal delay times to the first and second gate line groups to improve image quality and/or prevent imaging defects.

Signal delay times can be controlled in several ways, as described above. For example, line resistances can be changed in the first gate line group, the second gate line group, or both. One can also change the length of the first gate line group, the second gate line group, or both. Any change affecting signal delay times in the first or second gate line groups can be made, provided that the changes render the influence of line resistance on signal delay time in the first gate line group substantially equivalent to the influence of line resistance and capacitance on signal delay in the second gate line group, or that the change(s) improve image quality and/or prevent at least one imaging defect.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An LC panel comprising:

a display part and a non-display part;

the display part having gate lines and data lines arranged thereon, the gate lines having a first gate line group and a second gate line group;

the non-display part, having gate lines and data lines extending from the display part;

wherein the first gate line group extends from one end of the display part and does not overlap the extending data lines, wherein capacitance is not generated in the first gate line group; and wherein the second gate line group extends from an opposite end of the display part and overlaps the extending data lines, wherein capacitance is generated between the overlapping second gate line group and the extending data lines, wherein the length of the first gate line group is longer than that of the second gate line group and the line resistance of the first gate line group is greater then that of the second gate line group, wherein a signal delay in the first gate line group is generated by line resistance in the first gate line group and wherein a signal delay in the second gate line group is generated by line resistance in the second gate line group and by capacitance generated between the second gate line group and the extended data lines, wherein the signal delay generated by the first gate line group is substantially the same as the signal delay generated by the second gate line group.

2. A liquid crystal display device comprising:

an LC panel, the LC panel comprising:

a display part and a non-display part;

the display part having gate lines and data lines arranged thereon, the gate lines having a first gate line group and a second gate line group;

the non-display part, having gate lines and data lines extending from the display part;

wherein the first gate line group extends from one end of the display part and does not overlap the extending data lines, wherein capacitance is not generated in the first gate line group;

wherein the second gate line group extends from an opposite end of the display part and overlaps the extending data lines, wherein capacitance is generated between the overlapping second gate line group and the extending data lines;

a data driver electrically connected to the extending data lines; and a gate driver electrically connected to the extending gate lines, wherein the length of the first gate line group is longer than that of the second gate line group and the line resistance of the first gate line group is greater then that of the second gate line group, wherein a signal delay in the first gate line group is generated by line resistance in the first gate line group and wherein a signal delay in the second gate line group is generated by line resistance in the second gate line group and by capacitance generated between the second gate line group and the extended data lines, wherein the signal delay generated by the first gate line group is substantially the same as the signal delay generated by the second gate line group.

3. The liquid crystal display device of claim 2, wherein the gate driver is disposed on the LC panel.

4. The liquid crystal display device of claim 2, wherein the data driver is disposed on the LC panel.

5. A method for manufacturing a liquid crystal display device, comprising:

forming a gate lines include a first gate line group and a second gate line group on a substrate;

forming a gate insulating layer on the substrate and the gate lines; and forming a data lines on the gate insulating layer, wherein a display part has gate lines and data lines arranged thereon, wherein a non-display part includes gate lines and data lines extending from the display part, wherein the first gate line group extends from one end of the display part and does not overlap the extending data lines, wherein capacitance is not generated in the first gate line group, wherein the second gate line group extends from an opposite end of the display part and overlaps the extending data lines, wherein capacitance is generated between the overlapping second gate line group and the extending data lines, wherein the length of the first gate line group is longer than that of the second gate line group and the line resistance of the first gate line group is greater then that of the second gate line group, wherein a signal delay in the first gate line group is generated by line resistance in the first gate line group and wherein a signal delay in the second gate line group is generated by line resistance in the second gate line group and by capacitance generated between the second gate line group and the extended data lines, wherein the signal delay generated by the first gate line group is substantially the same as the signal delay generated by the second gate line group.

* * * * *